April 2, 1974  R. H. ESSENHIGH  3,801,469
METHOD FOR EFFECTING CHEMICAL REACTIONS BETWEEN CASCADING
SOLIDS AND COUNTERFLOWING GASES OR FLUIDS
Filed Aug. 31, 1971  5 Sheets-Sheet 1

INVENTOR
ROBERT H. ESSENHIGH

BY Cushman, Darby & Cushman
ATTORNEYS

United States Patent Office 3,801,469
Patented Apr. 2, 1974

3,801,469
METHOD FOR EFFECTING CHEMICAL REACTIONS BETWEEN CASCADING SOLIDS AND COUNTERFLOWING GASES OR FLUIDS
Robert H. Essenhigh, State College, Pa., assignor to Scientific Research Instruments Corporation, Baltimore, Md.
Filed Aug. 31, 1971, Ser. No. 176,523
Int. Cl. C10b 57/00
U.S. Cl. 201—17      5 Claims

ABSTRACT OF THE DISCLOSURE

A method and means for efficiently chemically reacting particulate solids and fluids such as gases in a continuous counterflowing process. The particulate solid is passed downwardly in a cascade through a baffle plate structure to materially increase its residence time in the reactor. The fluid is flowed upwardly through the same baffle structure. Dual cascade reactors using parallel baffle structures to keep two different solid particulates separated while yet facilitating fluid passage therebetween are shown which are particularly advantageous, for instance, in coal desulfurization where sulfur containing coal and calcium oxide particulates are passed in separate but parallel cascades and a hydrogen containing gas is successively passed between the dual cascades in a continuous dual cascade, counter-flowing desulfurization reaction. The upward flow of the gas through the baffle structure intermixes with the downward particulate flow substantially between baffle plates where the relative directions of flow are disposed at a substantial angle to thereby reduce the adverse effects otherwise ensuing from drag by the descending particulate stream on the surrounding fluid.

---

This invention generally relates to a method and means for contacting or reacting fluids (such as gases) and particulate solids, for the purpose of procuring reaction between the fluids and solids at their surfaces or interior, or between the fluids at the surfaces of the solids, or in the solids.

There are many circumstances which require reaction of fluids and solids. For instance, there is a series of coal desulfurization processes beginning with the process of contacting coal by hot gases (which may be multifarious products of partial pyrolysis of coal and other components) by which the coal is heated to temperatures at which pyrolysis reactions occur at operationally significant speeds. There is also the process of contacting coal (or partially pyrolysed coal or totally pyrolysed coal) by the same multifarious gaseous products, or modified products, or alternate fluids but all containing hydrogen such that reaction between the gaseous hydrogen and sulfur in the coal or coal residue occurs with the production of hydrogen sulfide ($H_2S$).

A related subsequent process involves the contacting of the resulting $H_2S$ and more relevant solid absorbent (such as calcium oxide) in such manner that the hydrogen sulfide is partially or totally removed from the gaseous stream, to a specified degree and/or as may be possible according to the details of the reactor design, with the calcium oxide forming calcium sulfide to some permissible or appropriate percentage of conversion.

The resulting calcium sulfide (that may simultaneously contain unchanged calcium oxide and/or other solid component that is relevantly inert in this context) is then contacted by hot gases (in a manner as determined by the operation of the cascade reactor) such that the calcium carbonate is heated to a temperature at which a thermal decomposition reactor will occur at operationally significant speeds.

Such reactions as indicated above may be permitted to occur in the same reactor or in a sequence of reactors but the desired net result is the removal of significant amounts of sulfur from the coal, to the hydrogen containing gases, then to the calcium oxides. Commercial grade sulfur is then extracted from the calcium oxide to upgrade its purity sufficiently to permit recycling. Similar types of reactions, per se, are explained in more detail in U.S. Pat. No. 2,824,047, issued to Gorin et al. in 1958 and in U.S. Pat. No. 3,481,834 issued to Squires in 1969.

Specifically, interest in removal of sulfur from coal derives from the societal and survival needs of human communities at large, and numerous means of achieving this end have been proposed. However, while this invention involves a cascade reactor to be later described in particular for a coal desulfurization process because of its significant interest to society, it must be remembered that the desulfurization of coal is only one utilization of this invention. It may also have application in other industrial and nonindustrial situations. Nevertheless, for the sake of clarity in explaining the invention, it is convenient to restrict discussion, for the most part, to the process of coal desulfurization, although as stated above this is in no way to be understood or interpreted as a limitation to the full range of possible applications of the invention.

The general problem of contacting fluids and solids has been previously solved in a variety of ways. The simplest is to support lumps of the solid on a perforated plate and to force the fluid through the bed so formed either from above or below. An early example is the burning of wood or coal or coke where contact between the fuel and oxygen in the air is required. If the reaction is confined mainly to the volume occupied by the solid (which is the case for coke but not the case with combustion of wood or coal) this simple system has the great advantage of compactness. As described, however, it is only a batch process with a single batch of material being reacted at a time. Since batch processing is inherently inferior as an industrial process to continuous flow processing, means of removing spent material and supplying fresh have been devised utilizing moving grates, belts, bands, scrapers, etc., often with acceptable degrees of success for specific processes.

In some processes, however, a relatively thin bed will allow too short a contact time between the fluid and solid for an acceptable level of reaction completeness to be achieved (sometimes known as low reaction efficiency), unless the gas flow through the bed is extremely slow which results in the output of the reactor becoming unacceptably low. Output could be increased to some extent by increasing the cross-sectional area of the reactor, but again there is an operationally acceptable limit. The usual solution developed over the times has been to increase the depth of the reactor bed with the consequent emergence of the vertical shaft reactor. The feed porblem is then solved by feeding in at the top and withdrawing converted or spent material at the bottom. This system utilizes gravity, which costs nothing, as the mechanism for maintaining flow through the reactor. At the same time, this shaft design can be used to complete many reactions in a shorter time if the fluid and solid reactants are flowing in opposite directions, that is to say, in counterflow. Counterflow is useful in those reactions where the rate of reaction increases with the reaction gas concentration but decreases with increased conversion of the solid reactant. At the delivery end of the reactor, the reactant gas concentration is high thus maintaining acceptable reaction rates; and at the solids input end, when the reactants gas concentration is low, the solids conversion is low, again maintaining acceptable reaction rates.

There are other reactions—again, coal combustion is a good example—where the reaction is not limited by contact time but by contact area. Increased reactor capacity is, in these cases possible by fine grinding the solid; and two separate reactor designs have derived from this. In the first, the solid is finely ground and is carried into the reactor on a stream of the reactant gas. This has proved to be highly efficient, for example, in burning coal (the pulverized coal boiler) although it has the following specific disadvantages: (i) the solids are now moving in co-current flow with the reactant gases when the chemistry of the process would dictate countercurrent flow (as described in the previous paragraph); (ii) the combination of co-current flow and stoichiometric requirements generally means that the solids density can be several orders of magnitude lower than in the solid bed or the shaft reactor; consequently, the physical structure of the reactor is excessively large for a given capacity with increased constructional costs of the reactor, reactor buildings, etc.

An alternative design for handling fine ground solid materials is the fluid bed in which the particles are just floating in the rising reactant gas stream. It has the advantage of a solids density that can be orders of magnitude higher than that of the co-current dispersion reactor such as the pulverized coal boiler, with a corresponding reduction in the reactor volume for a given capacity. However, if the solid reactant is not converted to fluid (as it is, for example, in combustion), removal of spent material to permit continuous flow operation will always include removal of appreciable unreacted solid because of the uniform dispersion of reacted and unreacted material due to the violent agitation of the fluidized particles. For that reason, the fluid bed is sometimes operated as a batch process. Likewise, the violent agitation and accompanying uniform dispersion of solid makes a counterflow process impossible, desirable though this may be from the chemistry of the process.

The reactors thus far described are only indicative of the prior methods of handling solids to contact fluids. When back reactions occur between the fluid product generated by the reaction and the converted or unconverted solid, the reactors so far described all have serious disadvantages. Cleaning of sulfur from coal by hydrogen is a good example where the hydrogn sulfide formed is quite rapidly resorbed on the semi-coke or coke it has just been removed from. In a fluid bed, of all the reactors described, a sorbent for $H_2S$ has the best chance of capturing the $H_2S$ before it is resorbed by the coke or semi-coke, but there is then the additional problem to be solved of separating the cleaned semi-coke or coke from the sorbent since the production of sulfur-free coal or coke is the desired output.

There is usually no one reactor design that satisfies all requirements of compactness, contact area, contact time, continuous, counter-flow operation, etc. Reactor designs are generally a compromise between conflicting requirements, and the design chosen in any given instance is generally one that minimizes the conflicts. The cascade reactor of this invention is no exception to this. It does, however, present an additional combination of advantages not previously seen together in any previous reactor.

Briefly, the cascade reactor comprising means for practicing the method of this invention consists in essence of a vertical shaft with plates attached in staggered fashion to opposite walls. Solid is supplied continuously or intermittently, as needed, at the top of the shaft. The solid is in a particulate form and is normally crushed or finely ground, or it may be chopped, or simply fed "as received" without pretreatment if this is warranted by its existing state of subdivision. The particulate solids fall down the shaft under gravity, cascading from plate to plate, for the most part, as they do so. The fluid of concern is fed into the bottom of the shaft and rises in effect vertically, with flow distortions, deflections and perturbations due to the plates in the shaft and to the cascading solids. The flow direction overall is countercurrent to the flow of solids although, locally, the precise details of flow behavior can result in the down flowing solid particulate stream intermixing at a substantial angle with the upflowing fluid stream. The stream of divided solids flow in jet or sheet-like fashion off one plate on to the next, on which next plate the stream of particles can impact almost at right angles, or at an acute or obtuse angle, depending on the plate inclination, plate spacing, flow properties of the divided solids, plate overlap, gas velocity, and like factors.

A somewhat similar structure, per se, is shown by Hasset in Industrial Process Heating for November 1966 for counterflowing particles and gases to obtain heat exchange therebetween; however, this is quite different from the chemical reactor discussed herein and certainly different from the dual channel reactor described below.

The cascade reactor and method of this invention therefore satisfies the following desirable criteria for chemical reactors (where the term chemical reactor is to be understood as not exclusive of such operations as, for example, combustion where the terms boiler, furnace, combustor, engine and so forth are more commonly but not exclusively used):

(1) It is a continuous flow process.
(2) It is a countercurrent or counterflow process.
(3) The average solids density within the reactor lies between the ranges found in solid or fluid bed reactors, and those found, for example, in pulverized coal combustor reactors, so that the reactor volume requirements are substantially less than for the latter (though they will be more than for the former examples).
(4) It is a process able to handle solids that are crushed, ground, or otherwise suitably divided.

The process of coal desulfurization is very efficiently carried out utilizing a dual channel cascade type of reactor according to this invention. Here, a dual channel baffled cascade apparatus is provided whereby coal containing sulfur is passed down one side of the apparatus in a cascade fashion from one baffle to the other while a solid material such as calcium oxide is passed down the other side of the apparatus to pass in a parallel but separate channel between similar successive baffles. While both of the cascade channels are exposed to one another for rapid gas transfers therebetween, provisions are made for insuring that the solid particulates flowing in each of the baffled channels do not mix with each other. Thereafter, a hot gas (containing hydrogen) passes first through the cascading coal channel and then through the cascading oxidized particulate channel and back again, etc., with the residence times for the solid particulate flow rates being above a certain level and the flow rate of the gas from one channel to the other being above a certain level.

In this manner, the hydrogen in the gas passing through the coal reacts with the sulfur therein to form hydrogen sulfide which is then carried by the flowing gas stream to the opposite but separate channel of oxidized particulate calcium oxide which reacts with the gaseous hydrogen sulfide to form calcium sulfide thus purifying the hydrogen in the gaseous carrier for reuse in the next higher level of the apparatus. Thus, the same gas carrier is continually recycled as it passes upward in the apparatus from one channel to the other and from one level to the other. First it picks up sulfur from the coal channel and then transfers it to the other separate but parallel channel before being reused in a similar cycle at the next higher level. Later conventional processes extract commercial grade sulfur from the oxidized particulate material flowing in the second channel of the apparatus.

These and other objects and advantages of this invention will be more fully appreciated and understood by reading the following detailed description in conjunction with the accompanying drawings, of which.

Figure 1:
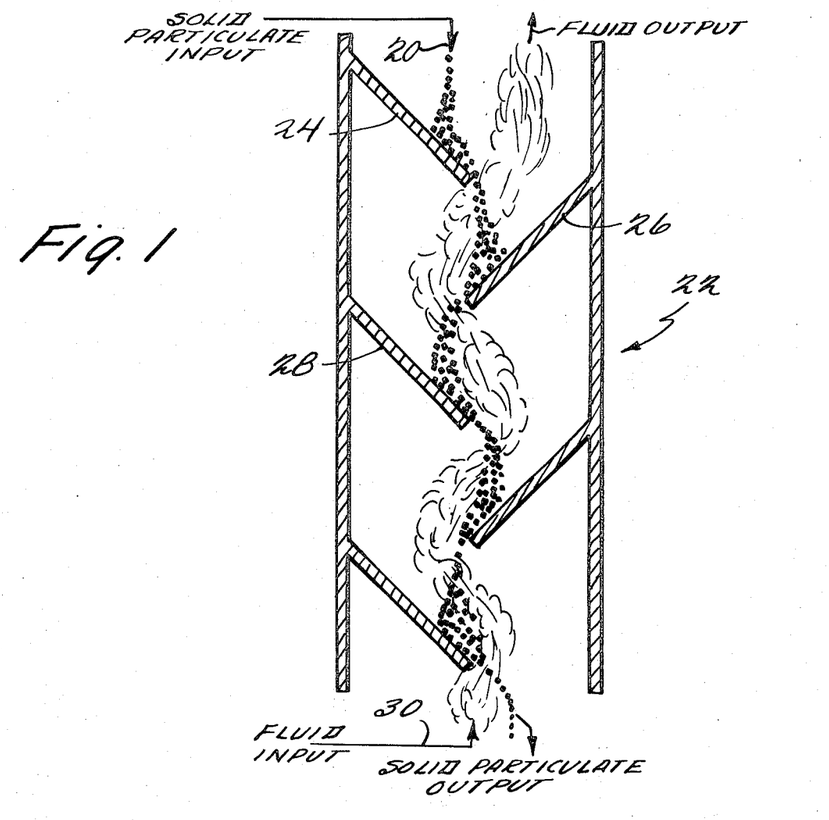
FIG. 1 is a cross section of a single channel cascade reactor according to this invention.

Referring to FIG. 1, a single channel reactor is shown according to this invention for practicing a method of reacting a single solid particulant and a fluid.

The solid particulate 20 is input at the top of the reactor 22. This stream of particulates falls under the influence of gravity to strike the first baffle plate 24 whereupon its fall is stopped or slowed while it slides down off plate 24 to the next succeeding and opposing plate 26. Here the process of slowing and sliding is repeated causing the particulate stream to be diverted in cascade fashion to the next plate 28, etc., as shown in FIG. 1. As previously explained, the size, spacing, orientation and number of the baffle plates is a design factor chosen to achieve at least some predetermined particle residence time in the reactor structure 22.

The fluid reactant 30 is input at the bottom of the reactor 22 and flows generally upwardly through the baffle plate structure as shown. While the flow is generally counter to that of the descending particulate, it is nevertheless true (as previously pointed out) that the local intermixing of the counterflowing fluid and particulate streams occurs between baffles at substantial (perhaps approaching perpendicularly) angles as shown in FIG. 1.

There is no other reactor known that satisfies the conditions of being both continuous and countercurrent, at the solid densities indicated (as amplified below) for divided solids. Feed of divided solids into the top of a vertical shaft without cascade plates results in the solids plummeting to the bottom in an almost continuous stream: a behavior sometimes known as *chute-en-masse*. The surrounding gas scarcely penetrates the fast descending stream which is moving under almost free fall conditions. Drag by the descending stream on the surrounding gas can locally reverse the direction of gas flow; the bulk of the gas flow in the meantime, short circuits any significant contact with the particle stream.

The introduction of cascade plates interrupts the stream of particles, bringing the stream periodically to rest. This increases the retention time in the reactor, thus increasing the range of possible reactions that can be handled in such a system, based on the premise that the reaction time must approximately or reasonably match the reactor retention time. The particles will still stream off each cascade plate on to the next more-or-less in free fall. Critically, however, the gas flow is now forced through the *chute-en-mass* stream, more or less at right angles or at least at a substantial angle as previously explained, thus preventing the short-circuiting of the gas flow and facilitating the required gas-solid contact. The successive baffle plates causing a cascade down and cascade up flow utilizes this cross-contacting process numerous times inside the reactor, between fluids and divided solids for the purpose of procuring reaction between the fluid and solid. The reaction occurs at: the solid surface and/or interior, and/or in the fluid phase with the solid participating actively or passively (e.g. catalytically); or with reaction between fluids at the surfaces of solids with the solid participating actively or passively; or in the solids, where reaction may be a pyrolysis, or drying, or thermal degradation or like process with passive participation of the fluid from the point of view of reaction (for example, by providing heat).

In construction of the reactor, any materials able to withstand the rigors of the mechanical, thermal, and reactive processes involved, may be used. For the higher temperature processes these may be for example, appropriate refractory metals or ceramics. Likewise, the plate thickness is only that required to withstand the same stresses of mechanical support, stability, erosion, thermal stability and so forth.

The angle of inclination of the plates is not critical. They may be steeply inclined to prevent hold up on the plates, or shallowly inclined, including horizontal or tilting upwards, if hold up on the plates is required for such purposes, for example, as increased reaction time or plate protection from the environment.

The plate spacing and overlap are critical only to the extent that these can determine the retention or residence time in the reactor combined with the ability of the reactor to handle given throughputs without bridging between plates and clogging the reactor. Theory and experiment are in agreement that the average velocity through the reactor is proportional to the square root of the vertical plate spacing, with the constant of proportionality quite reasonably calculable from first principles to a good approximation, and being reduced in a still undetermined but measurable manner with increasing gas flow up the reactor. The effect of gas flow is to tend to drag the particle stream in the direction of the gas flow, which is to say, approximately perpendicular to the particle stream flow, so that the particle stream impacts on the next cascade plate higher up, i.e. further from the tip of that plate. This increases the retention time in the reactor. Velocities through the reactor will be, typically, of the order of 1 ft./sec. and below.

The specific capacity of a reactor ($F_s$) is defined as the mass of solids (measured in tons, lb. or kg.) passing through the reactor, on average, per unit horizontal length of cascade shelf run (measured in ft. or m.) in unit time (hours). The total capacity of a reactor, F, is the product of specific capacity and shelf length, L: thus $F=LF_s$; where L is the actual length of a cascade shelf or the equivalent length per total unit in the case of divided or multiple shelves. The specific capacity is the product of the throughput velocity (v) of the solids (actual, average, or effective) with the depth of the particle stream (S) and the bulk density of the stream on the plate (B): $F_s=v.S.B.$ The bulk density is a function of the material being handled and the circumstances of deposition (particle size, cohesive index, real density, and so forth). The velocity is determined as described above. The depth of the particle stream is limited only by the minimum clearance between plates which is determined by the plate spacing and plate overlap. In general terms, all parameters can be calculated or estimated. Total capacities up to 100 tons per hour are theoretically possible for units with shelf lengths 5 to 20 ft., plate spacings 1 to 6 inches, with retention times of 20 sec. to 200 sec. (approximately) for units 10 to 30 ft. high, depending on the gas velocity. It should be clearly understood that the values given are intended only to be illustrative and not all conclusive.

Since the particle streams on the cascade plates are at the bulk density of the material this is the local density in the air as the stream slides off the plates. As the stream cascades onto the next plate the effect of the "countercurrent" gas flowing across the stream is to decrease the density somewhat so that it may even approach a typical fluid bed density. Because of the *chute-en-mass* effect, most particles stay within the particle stream: those few that escape are retrapped at the next gas/particle traverse. Although the particle streams locally are dense, the streams may occupy only $\frac{1}{10}$ to $\frac{1}{1000}$ of the total reactor volume, so that the *average* mass density in the reactor will typically be one to three orders of magnitude below that in a fluid bed: but correspondingly the values are much higher than in a pulverized coal boiler (for example). The following table of values illustrates this point in very general terms.

TABLE: COMPARATIVE VALUES OF AVERAGE SOLIDS DENSITY IN VARIOUS REACTORS (INDICATE RANGES)

[Units: gm./lit.=oz./cu. ft.=(1/16) lb./cu. ft.]

| | Density | |
|---|---|---|
| Water | $10^4$ | Normal range of solids densiteis. |
| Normal range of bulk densities. | $10^3$ $10^2$ | Normal range of fluid bed densities. |
| Range of cascade reactor densities. | $10^1$ $10^0$ $10^{-1}$ | Pulverized coal boiler: average injection density. |
| Range of densities in pulverized coal boilers (averaged). | $10^{-2}$ | |

This table illustrates numerically the point made earlier that the cascade reactor is a system handling average particle densities lying between the pulverized coal boiler and the fluid bed. The cascade reactor will not, therefore, compete with the fluid bed in terms of reactor size, but it is not intended to do so. It competes in terms of being more amenable to continuous flow processing, and of being capable of counterflow operation, as the fluid bed is not.

As another comparison, a set of 10 to 30 streams of 1″ to 3″ depth correspond to a range of 10″ to 90″ total depth (although distributed). These values bracket the typical bed depths found in fluid beds so, since there is no flow resistance in the cascade reactor comparable to the distributor plate of the fluid bed, the fan power and pressure requirements will be at least comparable, and at best lower for the cascade than for the fluid bed.

In terms of gas/particle contact time, the values approximated in the paragraph above indicate that the cascade reactor and fluid bed have comparable gas/particle contact times although the particle-gas contact times can be very much longer in the fluid bed. In the fluid bed, the residence time and hence the time for which a particle is contacting the reactive gas can be infinite, is so desired. (In that limit, of course, the reactor output of converted solid would be zero.) In the cascade reactor, the contact time is the residence time at a maximum, which may be up to 5 mins. under favorable conditions (but not excluding higher times in special cases), or less than the residence time since optimum contact between the particles and gas occurs during transit of the particles in free fall from one cascade baffle plate to the next. The period of residence on the plate does not exclude contact but can reduce reaction rate if the process then becomes boundary-layer diffusion limited. This will only sometimes be the case, and never for those decomposition or pyrolysis type reactions involving only the solid.

So far as the gas/particle contact time is concerned, this may be as little as 1/10, or less, of the mean residence time of the gas in the reactor. This is because contact is limited primarily (though not exclusively) to the transit time of the gas through the particle sheet which occupies 1/10 or less of the cascade reactor volume. The total depth of equivalent particle bed traversed, however, is comparable to the depths found in fluid beds, as observed above, which also utilize once through flow. At comparable velocities the residence times, and hence time for reaction will be comparable. Consequently, any gas/solid reaction that can go to completion or reasonably so in a fluid bed from the point of view of reacting fluid utilization will also go to completion or reasonably so in a cascade reactor. If reaction of either the solid with the fluid, or the fluid with the solid, is at an insufficient level of reaction completeness, a satisfactorily high level can always be achieved by recycling an appropriate proportion of the output.

The limited contact time between gas and solid is a disadvantage where this is the reaction of interest, but controllable by recycling as described above. However, it is an advantage where this is an unwanted reaction. For example (but not exclusively limited to this example), the formation of $H_2S$ in desulfurizing coal with hydrogen is required, but the $H_2S$ is very rapidly resorbed unless first removed by other means. This problem is met by the use of a multiple channel cascade reactor, where in this particular example two channels are utilized. The multiple channel cascade reactor is a cascade reactor in which cross-mixing of the fluids between channels is permitted, but in which two or more sets of cascade plates maintain two or more separate streams of the same or different solids, as specified by the technical requirements of the operation. In the example considered, $H_2S$ in the desulfurizing channel cross-mixes into an adjacent channel containing calcium oxide absorbed. Experiments have shown that the cross-mixing half-time can be as much or as little as 1/3 sec. Since the reactivity of $H_2S$ with calcium oxide is substantially greater than with coke, absorption is predominantly in the absorption channel. In the desulfurization channel, any $H_2S$ captured is brought back towards the original point of release because of the counterflow operation of the reactor, thus increasing the probability of secondary (and tertiary etc.) release and ultimate capture in the absorption channel.

Figure 2:
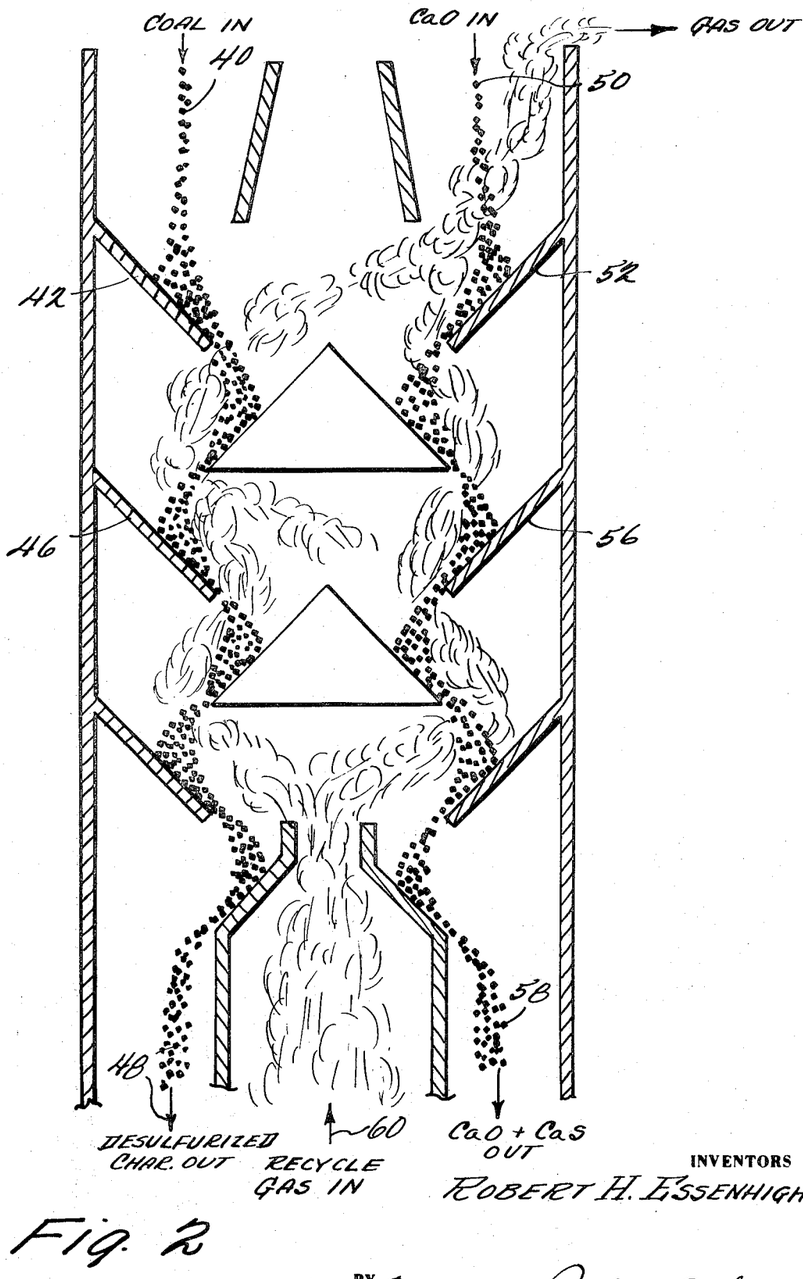
FIG. 2 is a cross section of a dual channel cascade reactor according to this invention which is particularly shown as being used in a coal desulfurization process.

An exemplary dual channel cascade reactor is shown in FIG. 2. Here a particulate coal stream is input on the left side at 40 and it cascades from baffle plate 42, to plate 44, to plate 46, etc. as shown in FIG. 2 until it exits at the left bottom side as desulfurized char at 48.

A particulate absorbent such as CaO is input at the right hand top at 50 and it cascades from baffle plate 52, to plate 54, to plate 56, etc. as shown in FIG. 2 until it exits at the right bottom side as CaO and CaS at 58.

Of course, the reason the coal loses sulfur and the CaO picks up sulfur on its trip downward is that simultaneously a hot hydrogen bearing gas input at 60 has been passing upwardly *and* back and forth between *both* channels of the reactor as shown. The hydrogen in the gas is the sulfur carrier and as previously explained the residence time of the particulate materials is maintained at higher than predetermined levels and the transit time of the gas between channels is maintained at lower than a predetermined level to insure that (1) sufficiently complete reactions occur and (2) that the $H_2S$ is not re-absorbed by the char itself.

Figure 3:
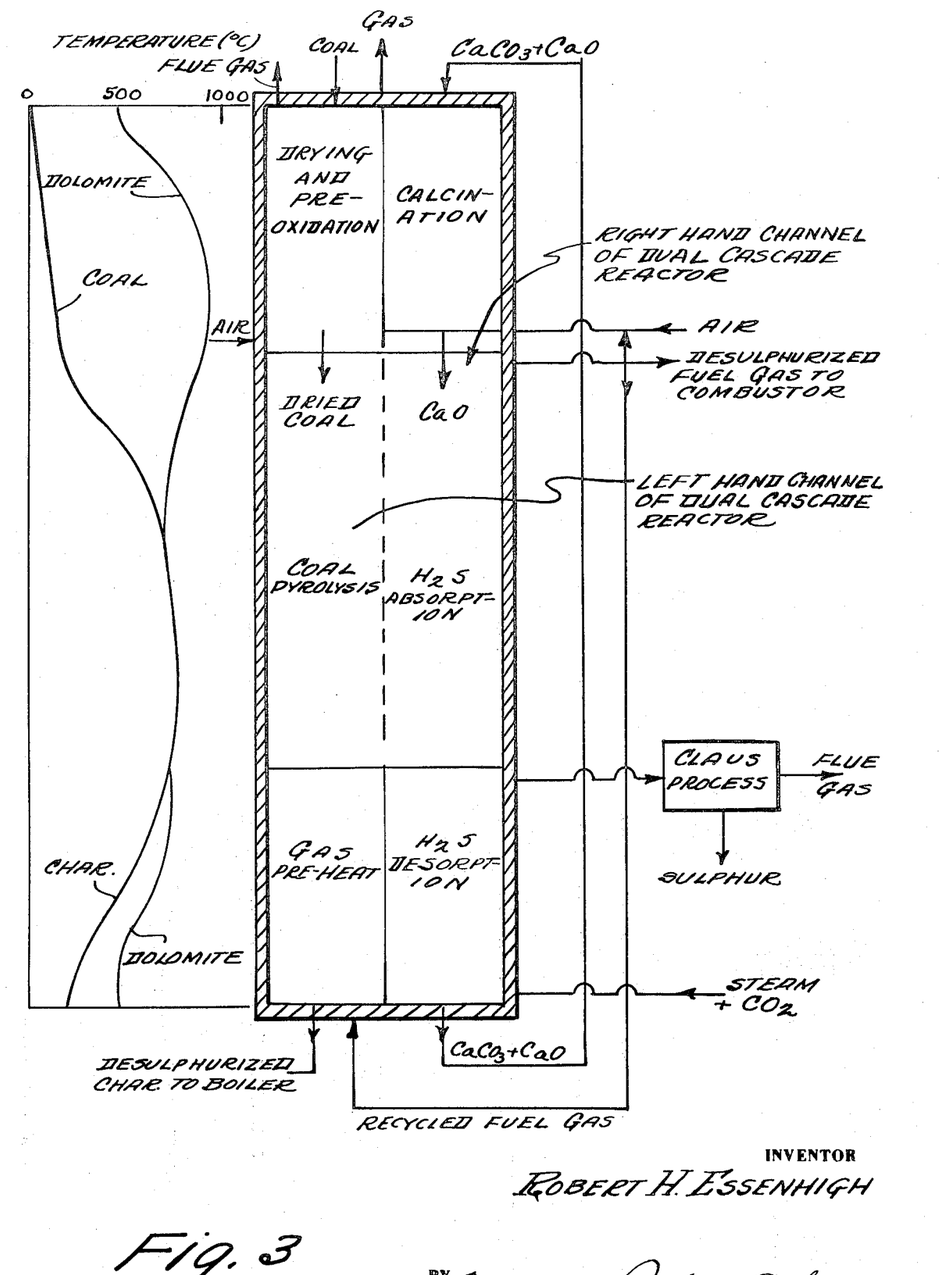
FIG. 3 is a simplified block diagram of a complete coal desulfurization process carried out according to this invention.
Figure 4:
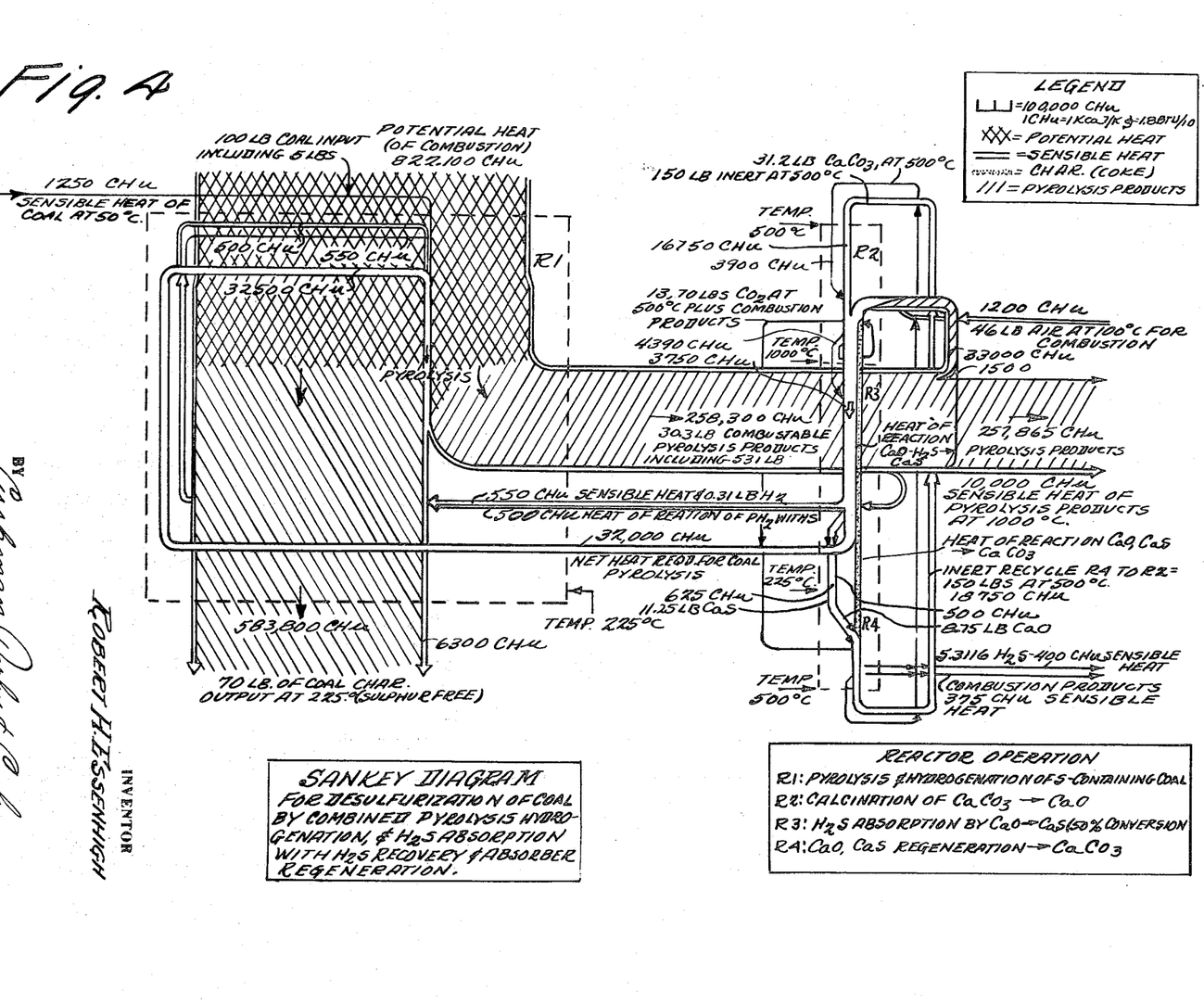
FIG. 4 is a Sankey diagram for the process of FIG. 3.

A simplified block diagram of an overall desulfurization system using the dual channel cascade reactor is shown in FIG. 3 and should be self-explaining to those in the art. Further, the energy flow system of this chemistry has been analyzed and shown to be favorable in the Sankey diagram of FIG. 4 which, again, should be self-explaining to those in the art.

In general, the dual cascade reactor is such that coal and calcined dolomite can be introduced into the top in parallel flows, each separately mixed intimately with an upflowing reaction gas so that there is a rapid and complete evolution of sulfur in a gaseous state from the coal and an efficient absorption on to the calcined dolomite without physical mixing of the two parallel particle streams.

In order that the overall rate process be commercially feasible, the residence times of the coal and calcium oxide particles must be long enough to complete the desulfurization reactions and the consequent absorption of $H_2S$ on the CaO. Also the oscillations of gas flow between the coal channel and the channel of calcined dolomite must have appropriate gas residence times to capture the $H_2S$ in the calcium oxide without the recapture in the reverse reaction of Organic III by the char. The following exemplary requirements should prove satisfactory: (a) One second per vertical foot residence time for the solid particles and (b) 90% gas transfer from one channel of the reactor to the other within one second.

A laboratory scale-model of the proposed dual channel reactor has been constructed and measurements of the residence times of the solid streams and of the gaseous transfer times were made using this model. Mass spectrometric sampling of a carbon dioide tracer gas at the various stages was employed to chart the fluid stream flow. Results of these measurements have indicated that the above requirements will be satisfied by the dual channel cascade reactor.

In the simplified block diagram of FIG. 3, the coal entering the top left of the reactor is first dried and lightly preoxidized to reduce agglomerization tendencies. The coal then enters the pyrolyzer stage where it is treated by convection of the recycled pyrolysis gas between the hot (1000° C.) calcined dolomite and the coal. The heat required in this reactor is provided by preheating the incoming recycled gas against the exiting char and by the hot incoming CaO. The heat required for calcination of the dolomite may be provided by combustion of char fines carried over with the dolomite and by combustion of a fraction of the fuel gas produced from the pyrolyzer. An approximate temperature profile for the reactors is shown on the left in FIG. 3.

To again summarize some of the advantages of this dual cascade method of solid-fluid reaction as it is specifically applied to coal desulfurization:

(1) The easily removable forms of sulfur are eliminated during heating of the coal without significant transfer of sulfur into the more difficult to remove forms.

(2) The counterflow of gas and solid with the gas oscillating between the coal and the calcined dolomite maintains the average $H_2S$ concentration in contact with the coal at a very low level, thus inhibiting the back reactions allowing effective desulfurization with short treatment times.

(3) The $H_2S$ can be efficiently desorbed from the adsorbent at sufficiently high concentrations for effective use of the commercial Claus process for converting to elemental sulfur as a marketable by-product.

As previously mentioned, a Plexiglas model of the proposed dual channel baffled cascade reactor was designed and built to enable laboratory measurements of residence times of solids and of gas flow patterns. This model was designed to enable variation of such things as coal feed rate, distance between cascade shelves, slope of shelves and upward gas velocity. The overall height of the model reactor was five feet and it included dual feed hoppers at the top, eleven cascade stages, dual solids collector chambers at the bottom and a velocity monitored variable gas feed system. Each cascade stage had multiple gas sampling ports which consisted of self-sealing fittings for gas sampling by fast response mass spectrometry. Air velocity measurements were made using an Annubar primary flow element which is based on the fundamental Bernoulli flow theorm.

Particle holding times were measured by timing the travel of the leading edge of the particle cloud through the eleven cascade stage system. This procedure resulted in a slight overestimation of means velocity but it was quite adequate to provide preliminary data for indicating relative holding effects of cascade shelves at given slopes and distances from each other.

Gas flow patterns were determined by measuring tracer gas distribution (using $CO_2$) throughout the reactor. Also velocity measurements between channels were made of step inputs of tracer gas. Both of these were done by sampling at both sides of each cascade stage using an available clinical mass spectrometer which provided a continuously direct reading of the partial pressure of carbon dioxide instantaneously (60 milliseconds) and with no disturbing effect on the pressure and flow at the sampling point. The inlet to the spectrometer was designed to measure the partial pressures of $CO_2$ of individual human breath by using a long catheter tube to effect a pressure drop from atmosphere down to an operating pressure of a millitorr thus enabling a rapid transit of the gases into the spectrometer. Because of this, only a small volume (approx. 0.1 cc./sec.) of sample gas is required and the time constant of the experiment was limited to the reflux response of the experimenter.

Figure 5:
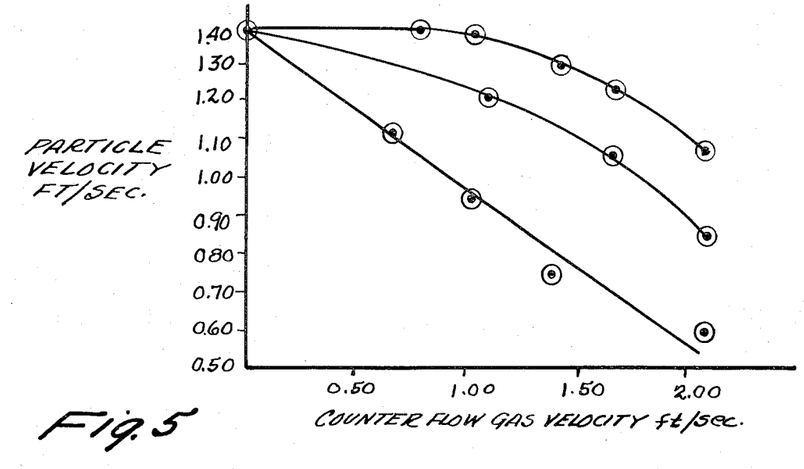
FIG. 5 is a graph showing experimental derived particle flow versus counterflowing gas velocity for various particle sizes in a model of a dual channel reactor according to this invention.
Figure 6:
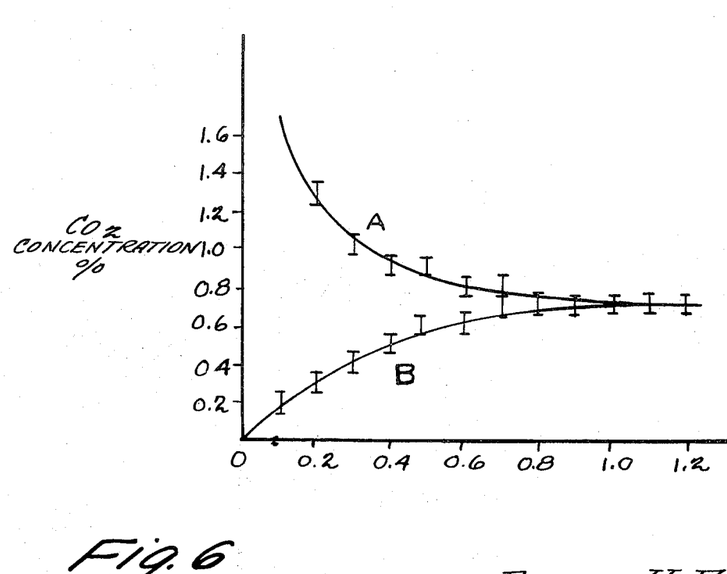
FIG. 6 is a graph showing experimentally derived times required for reaching equilibrium in fluid concentrations for a model of a dual channel cascade reactor.
Figure 7:
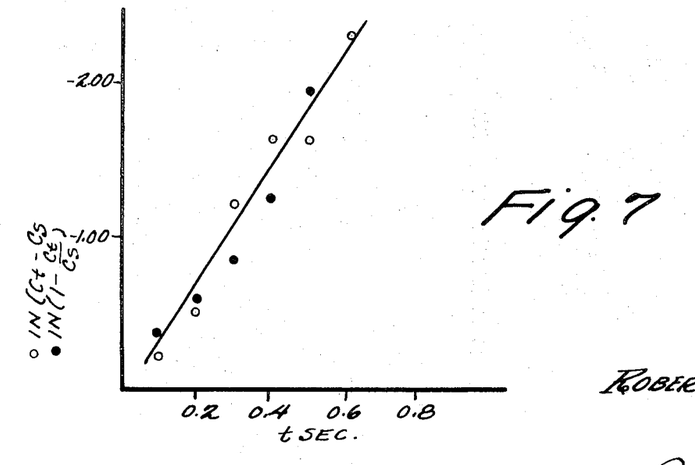
FIG. 7 is a graph showing the determination of the mixing half time for a model of the dual cascade reactor.

The results of experiments with this model dual cascade reactor are shown in FIGS. 5–7.

The transit times of the solids through the cascade reactor were determined and these times were converted to particle velocities. The results of this experiment are shown in FIG. 5 where the three curves are for A.S.T.M. 20–40, 40–60 and 60–100 mesh. In taking transit time measurements, the leading edge of the particle cloud was used. Since this leading edge represented those particles in a distribution of particles which are falling more rapidly than the average, the results in FIG. 5 are somewhat overstated; i.e., the average velocity is actually somewhat lower.

By inspecting FIG. 5 it can be seen that the particle velocity drops off with increasing counterflow gas velocity as would be expected and that the particle velocity for a given counterflow gas velocity decreases with decreasing particle size.

The velocity of the three particle sizes with no gas flow was 1.4 ft./sec. This value compares very well with the value calculated from the equation:

$$v = \tfrac{1}{2}\sqrt{gd}$$

where $d$ is the cascade depth and $g$ is the gravitational acceleration. With the plate spacing of two inches, $d=4$ inches giving $v=1.6$ ft./sec.

Visual inspection of the particle stream showed that the particles slide off each plate, in the plate direction, so they impinge on the plate below almost at right angles to it and about half way up. However, the results support the predicted behavior; namely, that flow through the system is dominated by gravity forces.

The results of the experiment with the model on rate of gas mixing, using the medical mass spectrometer, are shown in FIG. 6. The measurement points (bars on the graph) are sampling points located at equal vertical intervals along the reactor. The time was obtained by dividing the distance of the measuring port from the injection point by the counter flow gas velocity. The point at which the gas was injected represents the zero of time on the abscissa. It can be seen that less than a second is required to achieve a uniform gas mixture in the model reactor. Curve A shows the decrease in $CO_2$ concentration, as a function of time, on the side of the dual cascade reactor in which the gas is injected. Curve B shows the increase in $CO_2$ concentration, as a function of time, on the side of the dual cascade reactor opposite the injection point.

Curve A should represent an exponential decay due to the $CO_2$ cross-mixing between channels. This is represented mathematically as:

$$(C-C_s) = (C_0-C_s)e^{-t/\tau}$$

where $C_o$ is the initial concentration of $CO_2$; $C_s$ is the steady state concentration of $CO_2$; $C$ is the concentration of $CO_2$ at time $t$, and $\tau$ is the mixing half time. Analytically, $\tau$ may be determined by graphing 2.3 log $(C-C_s)$ vs. $t$. The plot should yield a straight line with slope of $-1/\tau$. This plot is shown in FIG. 7 with the solid point plots.

Curve B in FIG. 6 resembles a $(1-\exp)$ increase which is represented mathematically as:

$$C' = C'_o(1-e^{-t/\tau'})$$

where $C'$ is the concentration of $CO_2$ at time $t$; $C'_o=C_s$ =steady state concentration of $CO_2$ and $\tau'$ is the mixing half time. To obtain $\tau'$ analytically $(1-C'/C'_o)$ is plotted vs. $t$ to give a straight line with slope of $-1/\tau'$. This plot is seen in FIG. 7 using the open circle points.

The value of $\tau$ and $\tau'$ ideally should be equal so the two sets of points are plotted together to give a best fit of the points. From the graph of these points (FIG. 7) $\tau=0.27$ sec. indicating that 90% of the $CO_2$ is mixed within 0.9 second.

The results of such experiments are very encouraging in that they give good support to original calculations and estimates for the dual channel reactor. It appears quite possible that these findings can be used in scaling the mdoel up into an operable reactor.

While only a few exemplary embodiments of the methods and means of this invention have been particularly described above, those skilled in the art will readily appreciate that many modifications of the exemplary embodiments are possible without materially departing from the substance of the invention. Therefore, all such modifications are intended to be included in this invention.

What is claimed is:

1. A method for chemically reacting first and second particulate solids with the same fluid, said method comprising the steps of:
    flowing the first solid in a particulate form as a cascade flow down between a plurality of successively and opposingly positioned baffle plates, said baffle plates being dimensioned, spaced, positioned and of a sufficient number to achieve at least a predetermined particulate residence time period during passage between said baffle plates,
    flowing the second particulate solid as a cascade flow down between another plurality of successively and opposingly positioned further baffle plates in a separate channel of cascade flow from said first-mentioned solid particulate, said further baffle plates also being dimensioned, spaced, positioned and of a sufficient number to achieve at least a predetermined particulate residence time period during passage between said further baffle plates,
    passing said fluid generally upwardly in a counterflow through the baffle plates in both of said cascade flows whereby the upwardly directed fluid stream generally intermixes with the downwardly directed particulate flow during its passage from one baffle to another, and also
    passing said fluid back and forth between both of said cascade flows during its generally upward counterflow whereby the fluid is reacted successively with both of said particulate cascade flows without the two particulate flows being actually mixed,
    wherein said first particulate solid contains a substantial amount of coal, said second particulate solid contains a substantial amount of calcium oxide and said fluid is a gas containing substantial amounts of hydrogen.

2. A method for chemically reacting at least first and second particulate solids with a fluid, said method comprising the steps of:
    gravity flowing said first particulate solid downward in a cascade between a plurality of successive baffle plates alternately disposed on opposite sides of a first channel,
    gravity flowing said second particulate solid downward in a cascade between a plurality of successive baffle plates alternately disposed on opposite sides of a second channel distinct from said first channel,
    pressure flowing said fluid upward in said channels between said baffle plates to intermix with the downwardly directed particulate flows during passage from one baffle plate to another in the respective channels, and also
    flowing said fluid back and forth between said first channel and said second channel during the generally upward fluid flow whereby the fluid is successively reacted with both the first particulate and with the second particulate,
    wherein:
    said first particulate solid, when input, contains a substantial amount of sulfur-containing coal,
    said second particulate solid, when input contains a substantial amount of an adsorbent, and
    said fluid is a gas containing a substantial amount of hydrogen whereby the first particulate solid, when output, is significantly desulfurized and said second particulate solid, when output, contains substantial amounts of a sulfide.

3. A method as in claim 2 further comprising:
    preheating said gas before usage in said successive reactions by initially passing it upwards through a flow on the first particulate output, and
    predrying and oxidizing said first particulate solid before usage in said successive reactions by initially passing it downwards through a flow of air.

4. A method as in claim 3 further comprising:
    desorbing the sulfide from the second particulate solid output by passing steam and $CO_2$ upwards through a downward flow thereof, and
    collecting the desorbed sulfide for usage in a subsequent process to recover usable sulfur therefrom.

5. A method as in claim 2 wherein said gas is continuously recycled for reuse in said successive reactions.

References Cited
UNITED STATES PATENTS

| | | | |
|---|---|---|---|
| 3,330,046 | 7/1967 | Albertus | 263—32 R |
| 3,481,834 | 12/1969 | Squires | 201—17 |
| 2,165,143 | 7/1939 | Karrick | 201—34 X |
| 2,125,263 | 8/1938 | Ahlmann | 263—32 X |
| 1,702,738 | 2/1929 | Manley | 201—33 X |
| 2,717,458 | 9/1955 | Shabaker | 34—171 X |

FOREIGN PATENTS

| | | | |
|---|---|---|---|
| 620,399 | 10/1935 | Germany | 201—34 |
| 469,366 | 12/1928 | Germany | 201—33 |

NORMAN YUDKOFF, Primary Examiner

D. EDWARDS, Assistant Examiner

U.S. Cl. X.R.

201—26, 34, 37; 202—113, 121; 423—461